(12) United States Patent
Pesl

(10) Patent No.: US 7,720,765 B1
(45) Date of Patent: May 18, 2010

(54) SYSTEM AND METHOD FOR USING DIGITAL STRINGS TO PROVIDE SECURE DISTRIBUTION OF DIGITAL CONTENT

(75) Inventor: Marek Pesl, Leesburg, VA (US)

(73) Assignee: Vatari Corporation, Reston, VA (US)

( * ) Notice: Subject to any disclaimer, the term of this patent is extended or adjusted under 35 U.S.C. 154(b) by 616 days.

(21) Appl. No.: 11/458,800

(22) Filed: Jul. 20, 2006

(51) Int. Cl.
*G06Q 99/00* (2006.01)
(52) U.S. Cl. .......................... 705/54; 705/56
(58) Field of Classification Search .............. 705/50–79
See application file for complete search history.

(56) References Cited

U.S. PATENT DOCUMENTS

| | | | | |
|---|---|---|---|---|
| 5,708,709 | A * | 1/1998 | Rose | 705/59 |
| 7,051,211 | B1 * | 5/2006 | Matyas et al. | 713/187 |
| 2001/0034846 | A1 * | 10/2001 | Beery | 713/201 |
| 2002/0038428 | A1 * | 3/2002 | Safa | 713/187 |
| 2002/0144153 | A1 * | 10/2002 | LeVine et al. | 713/201 |
| 2007/0011441 | A1 * | 1/2007 | Eichenberger et al. | 712/221 |
| 2007/0121852 | A1 * | 5/2007 | Taylor et al. | 379/139 |

OTHER PUBLICATIONS

White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*

* cited by examiner

*Primary Examiner*—Andrew J. Fischer
*Assistant Examiner*—Jacob C. Coppola
(74) *Attorney, Agent, or Firm*—Whitham, Curtis, Christofferson & Cook, P.C.

(57) ABSTRACT

A method and system for secure distribution of digital content, using a disintegration tool under control of a distributor of the digital content to divide the digital content into protected and unprotected segments, delivering the unprotected segments to the customer along with installation software and identification information. The segments to be protected are modified using the identification information on the distribution medium and hardware information unique to a particular customer device. Upon communication of this information from the customer device, the modified segments are sent to the customer device for integration with the unprotected segments to generate a modified digital content operable only on the particular customer device.

4 Claims, 6 Drawing Sheets

355A

```
                    ENC_CORE
            Encoding Core – DST Kernel
              Scripted proprietary assembler:
DEFINITIONS:
   [ENCODE_FUNCTION] : RANDOM
   <RANDOM_1>
   GET_ENCRYPTION_SCHEME_CHOSEN_BY_DISTRIBUTOR
   IF (RAIDBLOCK)
      PICK_CPU_SERIAL_IDENT
      PICK_MAINBOARD_VENDOR_IDENT
      PICK_CREDIT_CARD_NUMBER
      HASH_THIS_RANDOM_HW_PICKS_AND_ID_PICKS_TOGETHER
      DERIVE_HASH_TO_MATCH_WITH_HARDWARE_IDENTS
      DERIVE_HASH_FOLLOWING_INSTRUCTIONS
      CREATE_INSTRUCTIONS_RETRIEVING_HW_INFO
      CREATE_INSTRUCTIONS_DECODING_HW_INFO_USING_HASH
      CREATE_INSTRUCTIONS_DECODING_FOLLOWING_INSTRUCTIONS
      CREATE_INSTRUCTIONS_JUMPING_TO_DECODED_ADDRESSES
      CREATE_INSTRUCTIONS_REVERTING_FOLLOWING_INSTRUCTIONS
   ELSE (STRATOS)
      PICK_CPU_SERIAL_IDENT
      PICK_MAINBOARD_VENDOR_IDENT
      PICK_CREDIT_CARD_NUMBER
      CREATE_SERVER_TIME_DEPENDENT_HASH
      CREATE_SERVER_TIME_DEPENDENT_INSTRUCTIONS
      HASH_THIS_RANDOM_HW_PICKS_AND_ID_PICKS_TOGETHER USING TIME HASH
      DERIVE_HASH_TO_MATCH_WITH_HARDWARE_IDENTS
      DERIVE_HASH_FOLLOWING_INSTRUCTIONS
      CREATE_INSTRUCTIONS_RETRIEVING_HW_INFO
      CREATE_INSTRUCTIONS_DECODING_HW_INFO_USING_HASH
      CREATE_INSTRUCTIONS_DECODING_FOLLOWING_INSTRUCTIONS
      CREATE_INSTRUCTIONS_JUMPING_TO_DECODED_ADDRESSES
      CREATE_INSTRUCTIONS_REVERTING_FOLLOWING_INSTRUCTIONS

<RANDOM_2>
   ...
   <RANDOM_3>
   ...
   ...
   ...
   <RANDOM_276>
   ...
```

*Figure 4B*

```
MAIN_PROGRAM:
00001 GET_UDS_DATA
   RETRIEVE_ALL_FILES
00002 FIND_START_PROGRAM_UDS_POINT
   RETRIEVE START POINTS OF ALL FILES
00003 FIND_WITHIN_FILES_ALL_CALL_JMP_AND_OTHER_SPECIFIC_INSTRUCTIONS
00004 GET_A_PROTECTION_LEVEL_RATIO_DEFINED_BY_DISTRIBUTOR
00005 EXECUTE_ENCRYPTION
   START_LOOP
   GET_#_FILE_TO_ENCRYPT
   START_LOOP
   FIND_NEXT_POINT_TO_ENCRYPT
   RETRIEVE_THE_ORIGINAL_POINT_INSTRUCTION
   RETRIEVE_INSTRUCTIONS_FOLLOWING_THE_ORIG_INSTRUCTION
   SAVE_SOME_INSTRUCTIONS_FOLLOWING_THE_ORIG_POINT
   DESTROY_AND_FAKE_SOME_INSTRS_FOLLOWING_THE_ORIG_POINT
   SAVE_THE_ORIGINAL_POINT_INSTRUCTION
   REPLACE_THE_ORIGINAL_INSTR_WITH_A_PROTECTION_CALLER
   LOOP BACK UNTIL THIS CURRENT FILE DONE
   LOOP BACK UNTIL ALL FILES DONE
00006 GENERATE_HW_FEEDBACK_MODULES
   LOOP_FILES
   LOOP_MODULE
   MAKE_MODULE
            RETRIEVE_THE_ORIGINAL_POINT_INSTRUCTION
            ENCODE_RANDOM (PICK_A_RANDOM_HW_IDENT & ID)
            ATTACH_MODULE_TO_THE_CURRENT_FILE
            HASH_MODULE
            HASH_SPACE_AROUND_THIS_MODULE
            GET_NEXT_ORIG_POINT_WITHIN_CURRENT_FILE
   LOOP_BACK_UNTIL_MODULE_RATIO_WITHIN_A_FILE_REACHED
   GET_NEXT_FILE_WITHIN_UDS
   LOOP_BACK_UNTIL_ALL_FILES_PROTECTED
00007 CREATE_AND_ENCRYPT_ADS_STRING
00008 QUIT_ENCRYPTION_ENC_CORE
```

SYSTEM AND METHOD FOR USING DIGITAL STRINGS TO PROVIDE SECURE DISTRIBUTION OF DIGITAL CONTENT

BACKGROUND OF THE INVENTION

1. Field of the Invention

The present invention generally relates to copy protection techniques, and more particularly to methods for secure distribution of digital content.

2. Background Description

Software is big business. Software developers, including video game makers, make copies of their software and distribute these copies to purchasers using a variety of distribution channels, including retail purchase of software on compact disk (CD) media and downloading purchased software from the Internet.

A major problem for software developers is protection against unauthorized copying, and loss of revenue from sales of the software by those who make copies without permission of the developer. A variety of copy protection schemes have been developed to prevent the making of unauthorized copies. One protection scheme is to build code into the software that requires the user to provide a software key the first time the software is run or installed on the user's machine. The developer (or the developer's distributor) gives the user this key in a separate transaction at the time of purchase or at the time the software is installed. Another technique, often used where the software is distributed on CD, is to build code into the software that will prevent the software from running unless it finds an original CD in the CD drive of the computer on which the software is being run. Yet another protection scheme is to manufacture CDs in such a fashion that copies will differ from the original in certain particulars, and then build code into the software that detects these particulars as a condition to installation.

However, pirates have been successful with all these schemes in devising a way to "crack" the copy protection mechanism and make a copy of the software that is free of copy protection and can be further copied and distributed with impunity. In each case the thief is able to obtain an original copy of the software and through various analytical techniques find a way to identify and then defeat the protection and produce copies that can be mass produced and distributed without authorization of the developer. Worse, once the protection has been defeated for one copy all other copies of the software having the same protection scheme are vulnerable. Even if expensive tools and significant effort were required to defeat the copy protection scheme, the final solution can be distributed and used with relative ease on other copies of the software.

SUMMARY OF THE INVENTION

It is therefore an object of the present invention to provide a mechanism for distributing digital content that cannot be defeated for all copies by breaking the encryption for one copy.

In accordance with the invention, a customer receives an incomplete data medium (RAW) with a program or game or other executable digital content purchased in the store or on the internet. This medium doesn't contain all files needed for running the purchased digital content. In order to install the digital content onto the customer's device, an Internet connection is made to a Digital String Technology (DST) server, and the customer's hardware vital information (CPU serial number, memory configuration, graphic card parameters, performance parameters, hard drive serial numbers, and the like) are sent along with the product ID of the RAW digital content to a server of the digital content's distributor or franchisee. The DST server will encode the customer's hardware specific information and the product ID of the RAW file and combine the encoded information with the missing executable files stored on the DST server.

The encoded files will execute only on hardware that matches the encoded information, so no customer device (computer, console, PDA, or other device) except the one on which the content was initially installed is able to run this distributor's program or game. These missing parts are built for a specific device and built only once, under the control of the DST server. The missing parts are then delivered to the customer over the Internet, but are only operable on the machine having the encoded information. After the missing parts are reassembled, each time the program operates it will collect data from the hardware components on the customer device for a match with the encoded machine information and fail if the match is unsuccessful, because instructions in the program or game are built according to these collected data. Therefore, any attempt to copy the reassembled installation to another device will cause the program to fail.

If the customer changes the hardware configuration of the operating device, this may also disable the program. The distributor who creates the RAW discs or installation packs has flexibility to determine which hardware elements are identified and encoded in the initial installation, so that hardware elements that would commonly be replaced during the normal lifetime of the equipment need not be included in the information encoded in the initial installation. Nor is it necessary for the distributor to identify to the customer the logic of the scanning algorithm that identifies which hardware elements are included. If the customer changes one of these identified elements, the program will have to be reinstalled, and the distributor will have to provide services for the reinstallation process. The logic of the scanning algorithm can be adapted to suit the marketing needs of the distributor, so that the possibility of reinstallation is not unduly burdensome to the customer or distributor. However, unauthorized copying of RAW discs or installation packs will be useless for software pirates and, on the other hand, copies of already authorized installations will fail when operated on other hardware, so this protection scheme is extremely effective.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
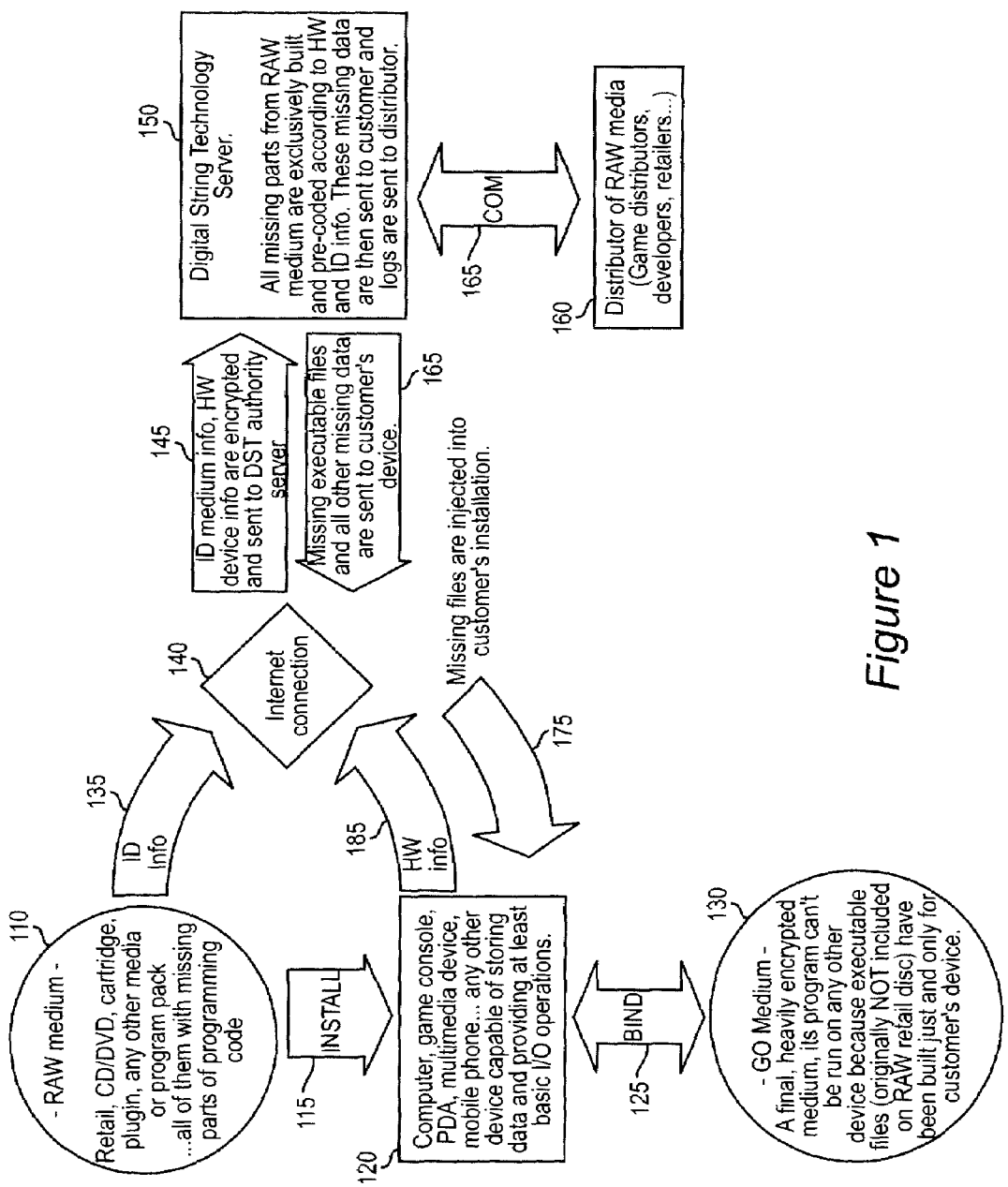
FIG. 1 is a schematic diagram showing operation of the invention.

Referring now to the drawings, and more particularly to FIG. 1, there is shown a schematic diagram of how the invention operates. The retail customer who purchases software receives only part of the executable software in the medium 110 created by a software distributor and received in the retail transaction. When this RAW medium is installed 115 on a particular device 120, the installation software will scan the device for information that uniquely identifies hardware components 185 and via Internet connection 140 communicates this information 145, together with the unique product identification key from the RAW medium 110, to the DST server 150. At the DST server 150 the product identification key is verified against the identification information 135 provided from the retail transaction, which also indicates which portions of the program have been omitted from the RAW medium. These omitted portions are provided to the DST server by the distributor 160 via communications link 155.

With this information the DST server 150 then builds these omitted portions, encoding them with the hardware identification information 185 and the product identification information 135. These omitted and, now, uniquely encoded files are then sent 165 to the customer via the Internet connection 140, where they are injected 175 into the customer's installation. Logs of these activities regarding disposition of the product key identified with the customer is then sent to the distributor through a communications link 155. The installation software included on the medium 110 obtained by the customer at retail binds 125 the omitted and uniquely encoded files to the RAW medium, creating an encrypted program 130, which cannot be run on any other device than the device described by the extracted hardware identification information 185.

Figure 2:
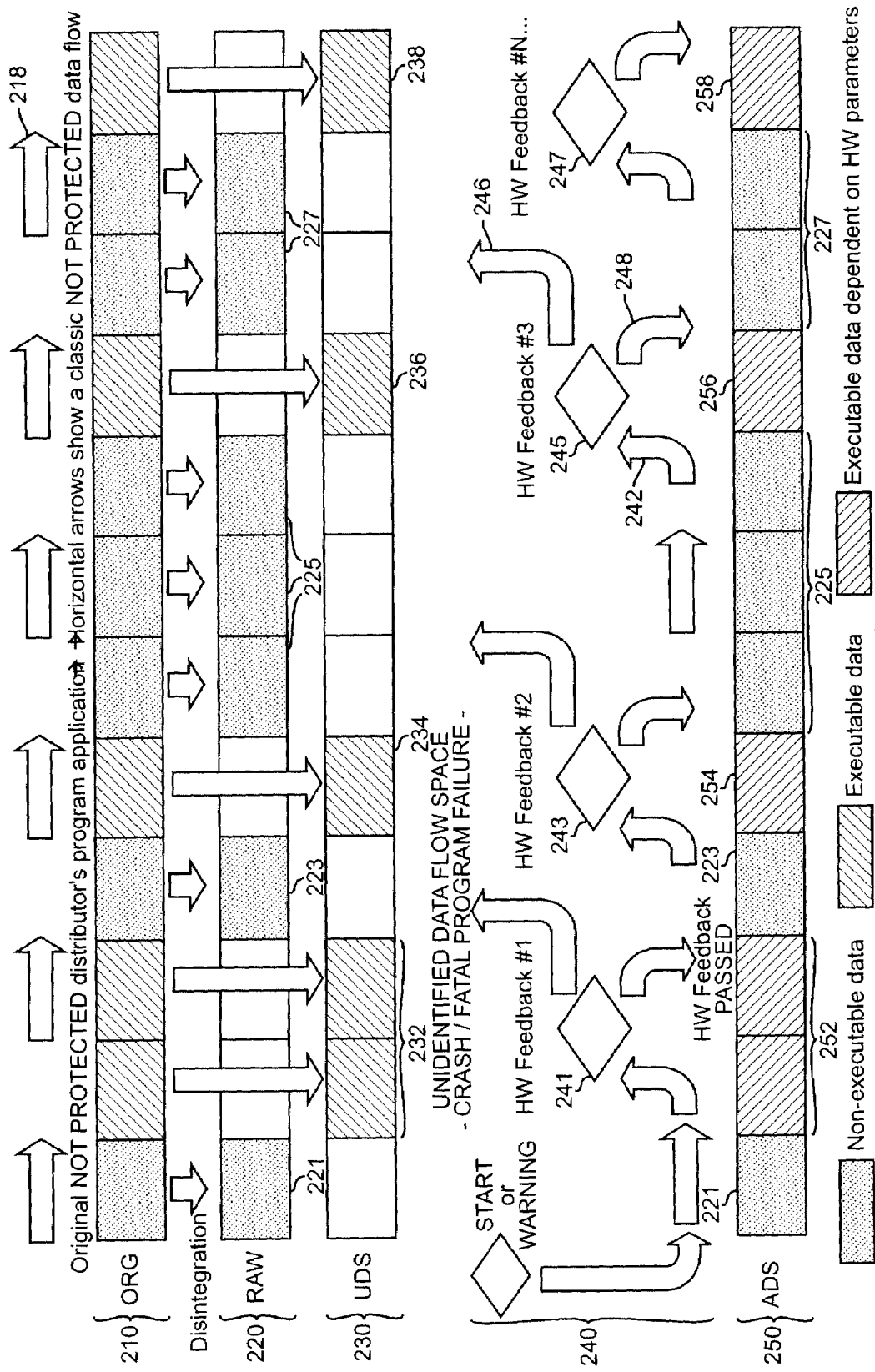
FIG. 2 is a data stream diagram showing how the content of an executable file is parsed and reconstructed in accordance with the invention.

An overall view of the way the invention modifies program code is shown in FIG. 2. The original and unprotected executable software 210 is shown as organized in a non-protected format, with a data flow from left to right as shown by the arrows (e.g. 218). This unprotected software 210 is divided by a Digital String Technology (DST) disintegration tool (not shown) into two different parts, a RAW part 220 and an unprotected digital string (UDS) part 230. The RAW part 220 includes only non-executable data (e.g. 225) or data considered by the distributor as too large or not crucial or important enough to be protected by the Digital String Technology mechanism. On the other hand, the UDS part contains executable program files (e.g. 235) and all data considered by the distributor as needing protection. The UDS part 230 produced by the DST disintegration tool is delivered by the distributor 160 for storage on a DST authorized server 150, and will not be accessible to the public.

It should be noted that FIG. 2 shows blank sections in the RAW file 220 where UDS portions are missing, and corresponding blank sections in the UDS file 230 where the RAW portions are missing. This visual device for the purposes of FIG. 2 is a conceptual representation of the information retained by the DST disintegration tool, under control of the distributor 160, so that the software can be reassembled upon injection of the missing files into the customer's installation 175.

The DST disintegration tool can be operated by the distributor 160 to create the RAW medium 110 which is delivered directly to the customer. The medium may be a CD, DVD, data cartridge, thumb drive, Internet download program pack, or any other form of distribution for digital material. Only the RAW part 220 will be delivered on the distribution medium 110, although the medium 110 will also include installation files necessary for generating the hardware information 185 and rebuilding an operable but protected version of the software based on the missing files injected 175 into the customer's installation.

When the customer runs the distributed copy of the program for the first time, all executable data desired to be protected by the distributor 160 (e.g. UDS segments 232, 234, 236 and 238) are missing. So, the user will be asked to connect to the internet. A secure connection to DST authorized server 150 is then established over the Internet 140 and all hardware specific information and parameters 185 are sent to this server. The UDS file 230 on DST authorized server 150 will be altered on a low-level assembler layer according to the customer's hardware data and device parameters 185 in such a way that the final programming code, Authorized Digital String (ADS) 250, will call specific memory addresses and carry out special assembler operations to confirm that these parameters agree with the physical information on the customer's hardware parts and components, which is directly accessible by the installed software.

This customer hardware data, in the form of device parameters 185, are used by DST authorized server 150 to construct an altered UDS 230. That is, these device parameters 185 are used to modify UDS segment 232 into ADS segment 252, and to modify the other UDS segments (e.g. 234, 236 and 238) into corresponding ADS segments (e.g. 254, 256 and 258). These modified code segments, with appropriate encryption if desired by the distributor 160, are then sent 165 for injection 175 into the customer device 120. The installation software, included on the RAW medium 110 and now resident on the customer device 120, then constructs operable ADS code 250 by combining the RAW code segments (e.g. 221, 223, 225 and 227) with modified UDS segments (e.g. 252, 254, 256 and 258) in proper sequence (e.g. 221, 252, 223, 254, 225, 256, 227 and 258).

However, in contrast to the lack of protection characterizing the original string 210, the ADS 250 is now fully protected in the sense that it cannot be run on another device, thereby serving the purposes of the distributor. Because of the nature of the protection provided by the invention, any copy of the protected ADS code 250 that is attempted to be run on another machine (i.e. a machine other than customer device 120 containing components having unique hardware parameters 185) will only result in fatal crashes and failures. When the program is started on the installed machine, hardware (HW) signatures will be verified for each of the selected hardware items whose information 185 was used to construct the ADS 250. If each of the selected hardware items is verified, the program will run. If any of the selected hardware items does not pass the verification test, the program will not run. In accordance with the verification logic set by the distributor 160, the customer may be provided with an opportunity to reestablish an operable ADS 250 to account for various configuration changes anticipated by the distributor 160, such as replacement of a failed component.

The verification sequence 240 is shown schematically on FIG. 2. For the purposes of illustration, verification sequence 240 shows hardware feedback #1 241, hardware feedback #2 243, hardware feedback #3 245 and hardware feedback #N 247. For each of these N hardware devices, the presence of the hardware device on the customer's system is verified. For example, the hardware information 242 stored in the ADS 250 for a particular hardware item 245 on the installed machine is matched against the information actually found on the machine running the ADS 250. If this found information is different from the information embedded in the ADS, the customer will be warned that program will not run 246. If the physical device information on the machine running the program agrees with the information embedded in the ADS 250, then the test has been passed 248 for the particular hardware item tested. Testing continues until all N hardware devices are confirmed to be present. Only then will the installed program run.

It should be noted that the program distributor 160 has considerable flexibility in determining how the testing protocol is constructed, so that the stringency of the test can be tailored to the customers to whom the program is being distributed. This flexibility is available in the disintegration tool, and allows the distributor 160 to include in the installation files on the raw medium 110 an intelligent logic that can adapt the distributor's security needs to the installation needs of a particular customer or class of customers. Thus the hardware information 185 generated by the same raw medium 110 may encompass a different configuration of hardware devices, depending upon the customer.

A further aspect of this intelligent logic is inclusion of maintenance capabilities for the initial customer configuration. For example, from time to time, a particular hardware device included in the initial configuration may fail or become obsolete or may need to be upgraded, and therefore may be uninstalled or replaced. The distributor's security strategy may, for example, tailor the intelligent logic to initiate a relatively automatic reinstallation cycle if one or two of the hardware devices in the configuration change, and require a more stringent reinstallation cycle if three or more hardware devices in the configuration change, or if certain pre-designated hardware devices change.

When data flow reaches the protected area (e.g. 252, 254, 256 and 258 in FIG. 2), all instructions within each of these areas will be built and carried out according to parameters gathered from the hardware information 185 on the customer's machine. During the loading sequence for operable ADS code 250, altered assembler instructions are built for each protected segment (e.g. 252, 254, 256 and 258), and these instructions will ensure that the protected segment will run properly only when the program is present on the same machine or device which it was authorized for. Otherwise it will result in crashes and fatal failures.

The protection mechanisms of the invention can be applied to content delivered via any media: CD and DVD programs, PC and MAC games and applications, console games, PDA programs, cell phone games, and products distributed on-line. Purchased physical media (such as CDs and DVDs) contain only a portion of files needed to run the installation program. The size and configuration of these files will depend upon on the decisions of the distributor, such as the size of the digitally pre-coded string, how many files are to be pre-coded and transferred to customer's device, and other decisions implemented via the DST disintegrator. This approach is advantageous because software pirates have no opportunity to examine and disassemble executable files, which are not included on the RAW medium 110. And when these files arrive from the DST server 150 to be injected 175 into the customer installation, they are in a form that has been adapted to the particular customer installation, and in particular for the program loading process on that installation. As indicated above, this loading process will construct assembler level instructions for each protected segment that will properly transition the flow of the program only if the program is run on the authorized customer machine. Consequently, the task of the software pirate is exponentially more difficult.

Another aspect of the protection provided by the invention is that no secondary program driver is required to be installed on the customer's device. There is no need to have the customer insert a hardware key, for example, or have a dongle attached to the installation. The distributor 160 is able to track all customers and their licenses, and may permit or deny additional authorizations required when a customer installation is upgraded so as to change one or more of the hardware devices whose information must be verified in order to run the program. In such circumstances, a new modified UDS string must be issued and re-injected 175 into the upgraded customer installation. The developer is able to use the interface 155 with the DST server 150 to manage specific authorizations required to upgrade any customer system.

In contrast to some protection schemes, the customer doesn't have to insert his RAW media 110 into its drive in order to use or play the program or game. The protection scheme of the invention binds the program to the customer's physical equipment, not to the distribution media. Another important difference between the present invention and other protection schemes is that the encryption techniques used in the present invention (e.g. used in sending 165 modified UDS code to the customer device 120) can be upgraded at any time if compromised. For example, if hackers crack prior art protections for a video game and distribute their unlocking techniques on the Internet, all distributed media will be compromised. However, even if a hacker were to crack a particular customer installation under the present invention, so that copies of that particular installation could be simulated, that would not compromise other customer installations since each one is different. Steps can then be taken not only to counter the hacker's crack by suitable upgrades to encryption techniques for future sale and distribution of RAW media 110, but to apply those same upgrades to existing installations that have not yet been cracked. Thus the Digital String Technology of the present invention gives a producer and/or distributor a powerful (and yet flexible) method for protecting their investments.

Note that the GO Medium 130 doesn't have to be the conventional CD-R or DVD-R writable medium. It may be whatever what can store data (hard drive, USE flash disc, memory card, etc.). The digital string of the invention—a pack of pre-coded files from DST server 150 that have been bound to a particular hardware device configuration at a customer installation—may be stored freely on whatever medium or storage device is convenient, without concern that a stolen copy may be used elsewhere, because no matter where the copy may be located for storage purposes it can only be loaded and run successfully on the particular customer installation having the particular hardware device information 185 extracted at the time of initial installation (and re-extracted upon any subsequent re-installation). The distributor 160 is assured his product will be run only on this particular customer installation.

Digital String Technology may use several protection modes, considering the flexibility provided by the assembler level instructions constructed upon loading the program. As will be recalled from the above discussion, these assembler level instructions ensure that continued program flow upon execution is dependent upon hardware information 185 specific to the particular customer device 120. However, the logic for using this information to construct these assembler level instructions are loading time can be controlled by the distributor 160 so that the loading process produces an executable file that is different each time the program is loaded. On the other hand, the modified UDS segments can be constructed so that the loading process always results in the same executable file.

The latter mode is called "Raidblock" and requires an internet connection only for the first authorization. Thereafter, users don't need an internet connection to run the program, except for downloading updates and obtaining approved re-authorizations. The former protection mode is called "Stratos". When a program is protected using this mode, the program must be authorized by the DST server 150 every time the program is launched. The protection mechanism embedded in protected files uses a cipher method which can be successfully resolved only when specific dynamic criteria are met. These dynamic criteria are still connected to hardware at the customer installation, but are not static hardware information such as a device serial number. Examples of such dynamic criteria include a server time variable, the current number of CPU ticks since the user's computer has been run, and similar information that is dynamically variable.

Figure 3:
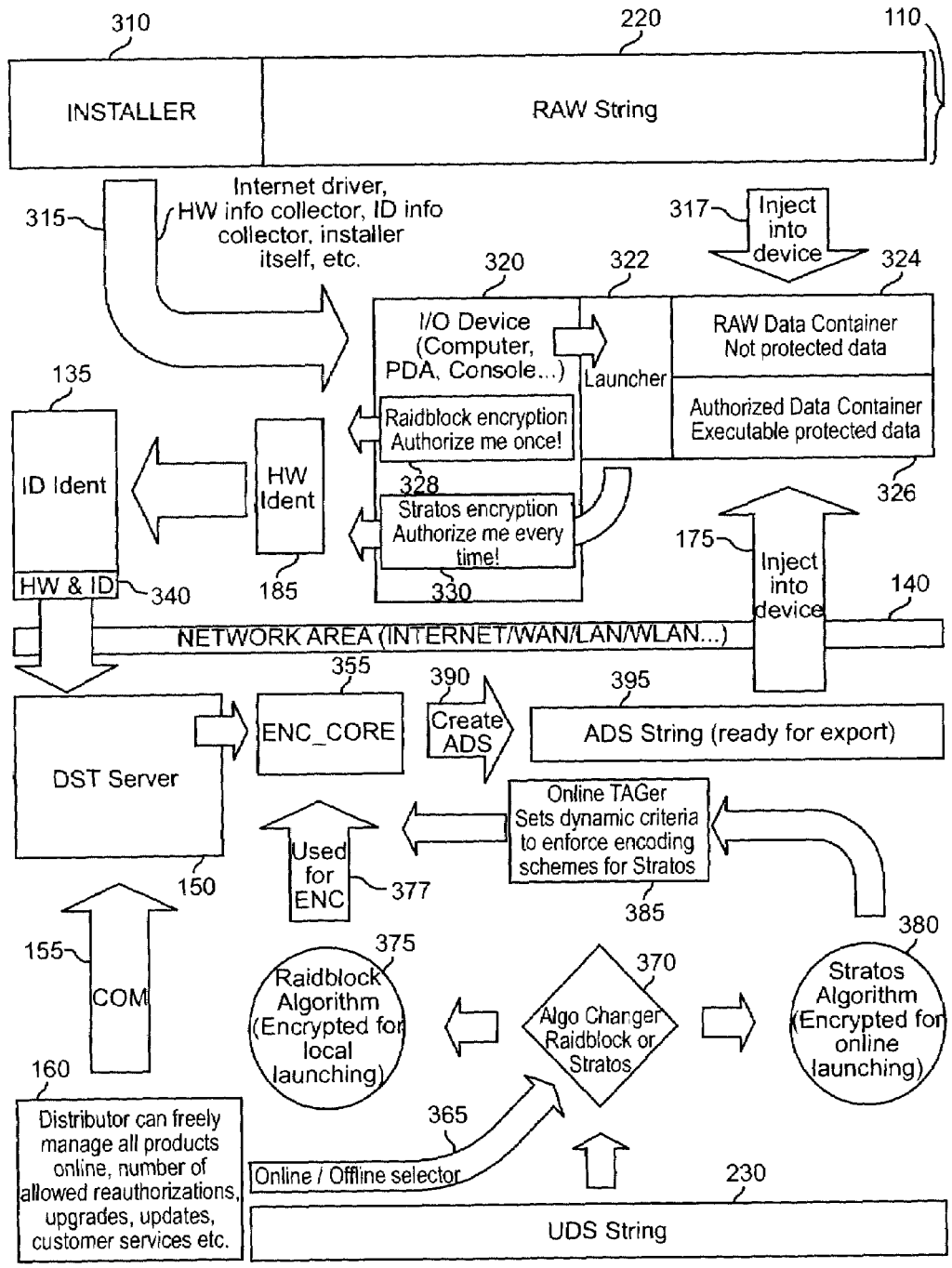
FIG. 3 is a schematic diagram showing operation of the authorization mechanisms provided by the invention.

The main difference between the Raidblock mode and the Stratos mode is that the Stratos mode allows the customer program to run only once or for so long as the dynamic criteria are met. Authorized executable files RUN OUT as they are used or when terminated. This may be understood with reference to FIG. 3, which shows installer 310 and RAW string 220, which are contained on RAW medium 110. Installer 310 provides an Internet driver, the ID information for the purchase transaction to a particular customer, routines to collect the necessary hardware information from the customer's installation, as well as the software that handles the installation. This is provided to the customer installation via an I/O 320 at the customer installation (i.e. a computer, PDA, console, or similar physical equipment). After injection 317 (via RAW Medium 110) into the customer device, the RAW string 220 is stored in RAW data container 324. At this point the protected files are not present in authorized data container 326, so launcher 322 seeks a connection to the DST server 150 over a network 140 (e.g. the Internet). As shown earlier in connection with FIG. 1, hardware identification information 185 and customer purchase identification information 135 are both sent 340 to DST server 150.

Distributor 160 controls 155 modification at DST server 150 of the UDS string 230. Selection of whether the program executable will require on-line authorization 365 is made, and this drives selection 370 of the Raidblock algorithm 375 or Stratos algorithm 380 for constructing an ADS string 395 that can be launched locally (i.e. Raidblock) or requires on-line launching (i.e. Stratos). Both the Raidblock algorithm 375 and the Stratos algorithm 380 will normally provide for encrypted code. The distinctive feature of the Stratos algorithm is the setting of dynamic criteria 385 which will require on-line authentication at load time. The output of both the Raidblock algorithm 375 and the Stratos algorithm 380 is provided 377 to the encryption process kernel 355, which creates 390 the encrypted ADS string (e.g. modified UDS segments 252, 254, 256 and 258 shown in FIG. 2), ready for injection 175 into the customer device and storage in Authorized Data Container 326.

At this point the launcher 322 will be able to complete creation of an executable by combining the unprotected data (e.g. RAW string 220 in FIG. 2) in the Raw Data Container 324 with the protected data (e.g. as shown by modified UDS segments 252, 254, 256 and 268 in FIG. 2). In the Raidblock mode 328, the above described authorization is done only once. In the Stratos mode 330 the executable must be reauthorized on each launch.

Figure 4A:
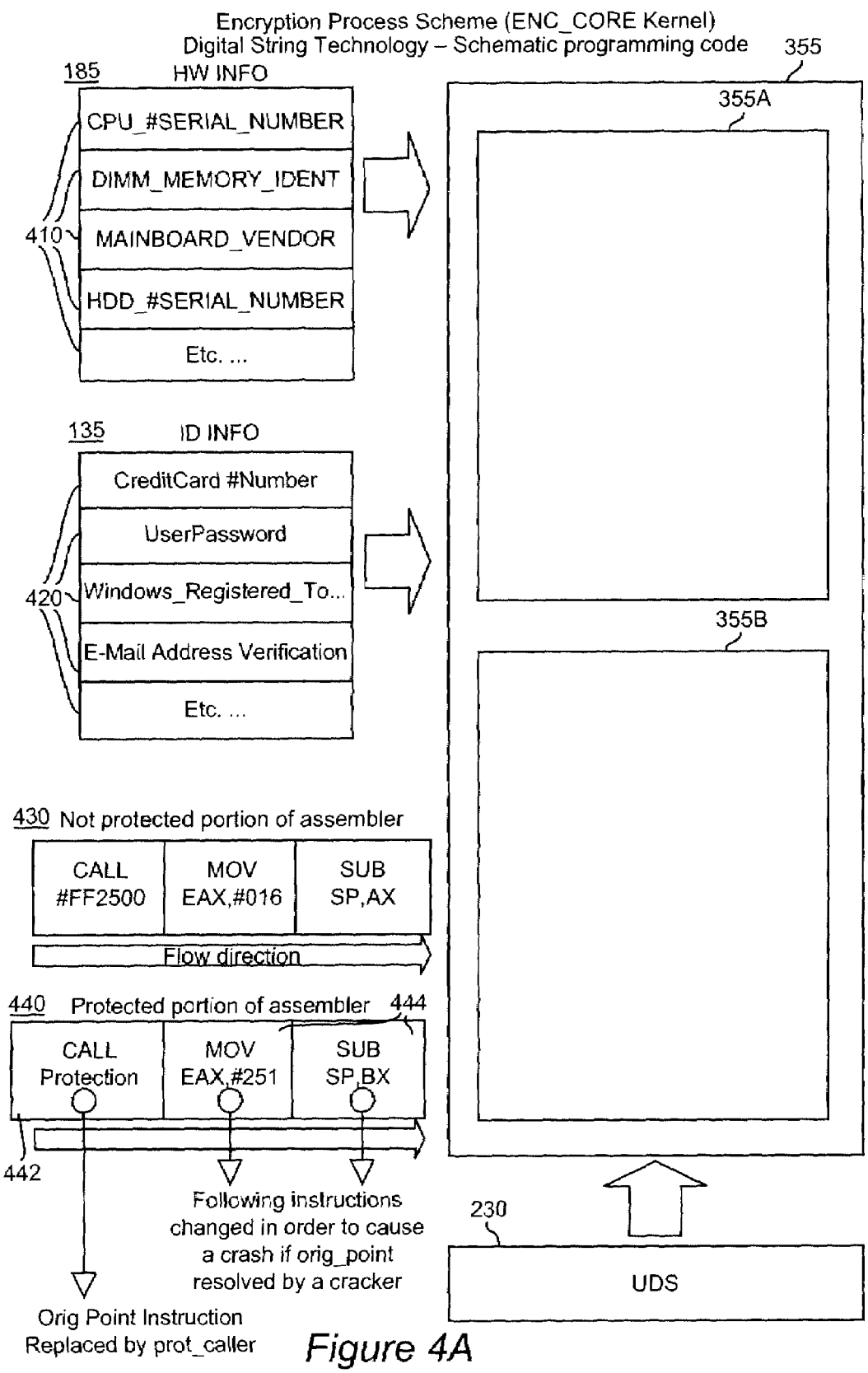
FIG. 4 is a schematic showing an encryption structure implementing the invention.

Further details of encryption process scheme 355 (containing blocks 355A and 355B) will now be explained with reference to FIGS. 4A, 4B and 4C. For both Raidblock and Stratos modes, specific data elements of hardware information 185 (e.g. cpu serial number, ID for memory, the motherboard vendor, serial number for the hard drive) 410 and transaction identification information 135 (e.g. credit card number, user password, Windows registration confirmation, email address verification) 420 are incorporated into the kernel 355 for building the modified UDS segments (e.g. 252, 254, 256 and 258). An unprotected segment will have assembler code, such as shown in item 430. This code is modified to provide protection, as shown in item 440. For example, call instruction 432 is modified so that the original instruction pointer is replaced by a pointer to a call protection routine 442. At load time, the call protection routine confirms the hardware information 185 and identification information 135 and upon successful confirmation writes the correct call 432 into the run time program (Stratos mode) or to the executable file stored on disk (Raidblock mode). The correct calls are scrambled into mathematical derivations or other custom functions, as will be understood by those skilled in the art. As an additional protection, the subsequence instructions 434 are modified 444 so as to cause a crash if a hacker is able to resolve the origin point 432. These modified instruction 444 are similarly corrected during program load.

For Stratos mode, the embedded protection callers (e.g. the routine pointed to by call protection 442) are designed to work only if certain dynamic conditions are met. In Raidblock mode, call protections will depend only on static conditions. Dynamic conditions depend upon something that is not settled when the segment of UDS string 230 is modified by kernel 355, whereas static conditions cannot be altered without a particular decision to do so. The classic dynamic condition is time, but those skilled in the art will understand how dynamic conditions can be identified and applied to the embedded protection callers.

For both Raidblock and Stratos modes, the essential characteristics of the invention remain. Copies of the program cannot be run on another device. But with the Stratos mode, the program needs a new online authorization every time it is started, and such authorized files (both in stored form before launch and the executable in memory after launch) are different at the binary level every time.

The usefulness of this capability may be understood from the following example. Suppose a hacker attacks computers at a secure installation and by some accident obtains access to these computers. The hacker is able to run and use any program, now that the firewall has been broken. It is as if a burglar has broken through a fence around a house and finds within the house a lot of valuable goods to take. But with the Stratos DST scheme, the house is empty. There needn't be a fence around the house, because there is nothing to be stolen from the house. All applications protected by Stratos are simply not physically present on the computer, except when run and used by an owner. When a Stratos executable is terminated, the program is lost and only the loader remains. Even when a hacker has the superior skills to steal a program that is in use, such programs can't simply be run on the hacker's computer. Further, with Stratos, the machine specific criteria are necessary not only for running the program but also for decrypting the authorized program, and this encryption is different every time. If Stratos is used to protect all programs at an installation, no firewall is necessary because nothing of value can be taken.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer implemented method for secure distribution of digital content, the method comprising:

disintegrating, by a hardware server, the digital content into a plurality of segments;

selecting, from the plurality of segments, segments to be protected, the remaining unselected segments to be being-unprotected;

including the remaining unselected segments in a medium for distribution, the selected segments to be protected being omitted from the medium for distribution, the medium also including installation software and distribution identification information;

receiving the remaining unselected segments, the installation software, and the distribution identification information on a particular customer device;

executing the installation software on the particular customer device, the installation software extracting from the particular customer device hardware identification information unique to the particular customer device;

receiving, by the hardware server, the distribution identification information and the unique hardware identification information extracted from the particular customer device, the distribution identification information identifying the selected segments to be protected;

modifying, by the hardware server, the selected segments to be protected so as to include the distribution identification information and the hardware identification information unique to the particular customer device, the modifying further comprising:

confirming the distribution identification information, and for each segment of the selected segments to be protected:

replacing an assembler level call instruction with a pointer to a call protection routine; and altering one or more assembler level instructions that follow the replaced call instruction;

injecting, by the hardware server, the modified segments to the particular customer device;

integrating, on the particular customer device, the remaining unselected segments with the modified segments, thereby generating on the particular customer device modified digital content operable only on the particular customer device; and executing the call protection routine on the particular customer device, the executing further comprising:

confirming that hardware components corresponding to the hardware identification information are present on the particular customer device; and in response to said confirming, restoring the replaced assembler level call instruction and the altered one or more assembler level instructions that follow the replaced call instruction.

2. The method of claim 1, wherein the unique hardware identification information is obtained by the hardware server over the Internet in a transmission from the particular customer device, under direction from the installation software made resident on the customer device from the medium used for distribution.

3. The method of claim 1, wherein the injecting step further comprises:

transmitting the modified segments to the particular customer device over the Internet in response to an authorization request from the particular customer device; and the integrating step further comprises:

combining the unprotected segments and the modified segments at the particular customer device to produce a load file, the load file being able to generate an executable for running the digital content.

4. The method of claim 1, wherein the restored assembler level instructions are written to a run time program in memory.

\* \* \* \* \*